United States Patent [19]

Cowley et al.

[11] 4,251,224
[45] Feb. 17, 1981

[54] CONTROL SYSTEM FOR CHLORINE DIOXIDE PLANTS

[75] Inventors: Gerald Cowley, Mississauga; Richard Swindells, Caledon, both of Canada

[73] Assignee: ERCO Industries Limited, Islington, Canada

[21] Appl. No.: 74,958

[22] Filed: Sep. 13, 1979

[30] Foreign Application Priority Data

Sep. 19, 1978 [GB] United Kingdom ............... 37336/78

[51] Int. Cl.³ .................. C01B 11/02; G06G 7/58
[52] U.S. Cl. .................. 23/230 A; 364/105; 364/500; 422/62; 423/478
[58] Field of Search ............. 423/477, 478; 23/230 A; 422/62, 105; 364/499, 500, 105, 106

[56] References Cited

U.S. PATENT DOCUMENTS

| 3,663,805 | 5/1972 | Carr et al. | 364/500 |
| 3,725,653 | 4/1973 | Carr et al. | 364/500 |
| 3,781,533 | 12/1973 | Barnstone et al. | 364/500 |
| 3,789,108 | 1/1974 | Rapson | 423/478 |
| 3,864,456 | 2/1975 | Winfield et al. | 423/478 |
| 4,053,743 | 10/1977 | Niemi et al. | 23/230 A |

*Primary Examiner*—Ronald Serwin
*Attorney, Agent, or Firm*—Sim & McBurney

[57] ABSTRACT

A machine-controlled chlorine dioxide generating process which produces a gaseous mixture of chlorine dioxide and chlorine is described. Efficiency determinations are made from gas analysis and adjustment made as required. The gas analysis may be used in combination with actual production rate and required production rate machine determinations, possibly along with reaction medium analysis, to adjust operating parameters as required to attain optimum production rate and chemical usage.

14 Claims, 3 Drawing Figures

CONTROL SYSTEM FOR CHLORINE DIOXIDE PLANTS

FIELD OF THE INVENTION

The present invention is directed to the production of chlorine dioxide, and more particularly to the control of chlorine dioxide production by the measurement of key parameters.

BACKGROUND OF THE INVENTION

In U.S. Pat. No. 3,864,456 assigned to the assignee of this application, there is described a process for the production of chlorine dioxide which involves the reduction of sodium chlorate in an aqueous acid reaction medium which is maintained at its boiling point at the absolute pressure thereon while a sub-atmospheric pressure is applied to the reaction zone in which the reaction medium is located. The boiling temperature is greater than about 30° C. and below the temperature above which substantial decomposition of chlorine dioxide occurs, preferably about 60° to about 80° C.

The reducing agent is chlorine ions provided by added sodium chloride, hydrogen chloride or a mixture of the two while the acid is provided either wholly by sulphuric acid in the case where sodium chloride alone is used as the source of chloride ions or partly by sulfuric acid and partly by hydrochloric acid in the case where hydrogen chloride along or in admixture with sodium chloride is used as the source of chloride ions.

The process operates on a continuous basis with reactants being continuously fed to the reaction medium and a gaseous mixture of chlorine dioxide, chlorine and water vapor being continuously removed from the reaction zone. The reaction medium is maintained at a total acid normality in the range of about 2 to about 4.8 normal and anhydrous neutral sodium sulphate is continuously crystallized from the reaction medium, once saturation is reached after start up. The crystallized sodium sulphate is removed from the reaction zone on a continuous or intermittent basis.

The just-described chlorine dioxide-producing process is commercially advantageous in that chlorine dioxide generation, water evaporation and by-product crystallization occur in the same vessel, anhydrous neutral sodium sulphate is formed directly, and a low total acid normality is employed. These and other qualities have led to wide commercial acceptance and implementation of the process.

It is known from U.S. Pat. No. 3,563,702 to increase the efficiency of production of chlorine dioxide by the above-described process from about 90 to 92% to about 97 to 98% by the use of certain catalysts, and silver salts commonly are used in commercial practice.

By the term "efficiency" is meant the degree of conversion of sodium chlorate fed to the reaction medium to product chlorine dioxide. The chlorine dioxide-producing reaction is represented by the following equation (1):

$$NaClO_3 + NaCl + H_2SO_4 \rightarrow ClO_2 + \tfrac{1}{2}Cl_2 + H_2O + Na_2SO_4 \quad (1)$$

There is a competing reaction which produces no chlorine dioxide and this reaction is represented by the following equation (2):

$$NaClO_3 + 5NaCl + 3H_2SO_4 \rightarrow 3Cl_2 + 3H_2O + 3Na_2SO_4 \quad (2)$$

The efficiency of the process, therefore, is the extent to which the reaction of equation (1) can be made to predominate over the reaction of equation (2).

Since any decrease in efficiency of the process means that lesser quantities of sodium chlorate are converted to the desired chlorine dioxide product, and since sodium chlorate and silver salts are expensive raw materials, it is desirable to maintain the efficiency at as high a level as possible at all times. A number of factors can affect the efficiency of the process, mainly catalyst concentration and, to a lesser degree, mole ratio of chlorate ion to chloride ion in the reaction medium and temperature of the reaction medium.

In continuous plant operations, manual determinations of efficiency are effected to ensure operation at the desired efficiency level, any decrease in efficiency usually being compensated for by the addition of further quantities of catalyst, usually a silver salt, to the generator. In the event that the addition of further catalyst does not produce the desired result, then the operator must attempt to locate the source of the problem, which may be difficult to achieve.

Two types of efficiency determinations may be made, one based on the quantity of chlorate consumed and the quantity of chlorine dioxide produced. This determination provides an efficiency expressed as a percentage, signifying the percentage of one mole of chlorate which is reacted by equation (1) to form chlorine dioxide. This efficiency determination is only rarely made when a mass balance of the system is required, the chlorate feed and chlorine dioxide product values being monitored over the time interval and the determination being made from these monitored values.

The other manual determination which is made is the Gram Atom Percent Chlorine Dioxide (GA% $ClO_2$) value of the product stream. GA% $ClO_2$ is determined from the following equation (3):

$$GA\% \; ClO_2 = \frac{Cl \; in \; ClO_2}{Cl \; in \; ClO_2 + Cl \; in \; Cl_2} \times 100$$

by determining the chlorine atom present in the product gas stream as chlorine dioxide and chlorine.

The GA% $ClO_2$ value is an accurate representation of the chemical efficiency and 100% efficiency is reached at a GA% $ClO_2$ value of 50%. This value is a valid determination of efficiency for the above-described process since chlorine is produced along with the chlorine dioxide and is present in the product gas stream, in contrast to some chlorine dioxide-producing processes wherein the chlorine is reduced in situ to form chloride ions and the GA% $ClO_2$ value would not represent a true indication of efficiency.

The determination of efficiency as the GA% $ClO_2$ value is simpler to effect than the determination based on measurements of chlorate consumed and chlorine dioxide formed, requiring the withdrawal of a sample of product gas and analysis of the sample, generally by wet chemical means, to determine chlorine dioxide and chlorine contents. The GA% $ClO_2$ determination, however, is made at widely-spaced time intervals typically varying from once a shift to once a week. However, the product gas stream is at a high temperature and under subatmospheric pressure and operator skill is required to collect a representative sample for analysis.

Owing to the necessity for skilled operation and the problem of representative sample collection, the GA% $ClO_2$ efficiency value determined may be incorrect. Further, variations in efficiency between the periodic determinations are not compensated for. As a result, the overall efficiency of the chlorine dioxide producing process on a long term basis may well be, and usually is, less than the optimum, leading to less overall chlorine dioxide production and increased chemical and catalyst usage than the optimum.

As a result of variations in efficiency between efficiency determinations, not only is chemical usage less than optimum but also the concentration of the chlorine dioxide solution produced varies. This variation in chlorine dioxide concentration leads to variable pulp quality when the solution is used for bleaching.

Another important parameter of the process is the rate at which chlorine dioxide is produced, since this rate must be at least equal to the rate at which chlorine dioxide solution is consumed in the end use thereof. At the present time, a target production rate is set for the process, but little attempt is made to ensure that the production rate meets the requirements for product, which may vary from time to time.

In large volume chlorine dioxide generators, the system is less sensitive to changes in conditions, such as, chloride to chlorate mole ratio and catalyst concentration in the reaction medium and temperature, than in smaller volume generators having the same chlorine dioxide production capacity. In view of the fabricating costs of chlorine dioxide generators, which are generally constructed of titanium, the trend is to smaller volume generators, which leads, as noted above, to greater sensitivity of the process to parameter variations.

For greater overall efficiency and increased chlorine dioxide production and hence decreased raw material costs in the form of sodium chlorate and catalyst, and the production of more uniform product, it is necessary to provide a continuous accurate and rapid determination of efficiency, production rate and other parameters of the system, so that all variations affecting the chlorine dioxide production can be compensated for.

SUMMARY OF THE INVENTION

The present invention provides a machine-controlled continuous process for the production of aqueous chlorine dioxide solution by contact with water of a product gas stream containing chlorine dioxide and chlorine formed by reducing chlorate ions with chloride ions in the substantial absence of any reducing agent for chlorine in an aqueous reaction medium. The process involves continuous machine analysis of the product gas stream to determine the relative concentrations of chlorine dioxide and chlorine therein and continuous machine computing from the relative concentrations the efficiency of production of chlorine dioxide by reduction of chlorate ions.

The concentration of the chlorine dioxide in the aqueous solution is continuously analyzed, the flow rate of water to the products gas stream is continuously monitored and the actual production rate of chlorine dioxide is continuously machine computed from the concentration analysis and flow rate determination.

The operational data of the process is continuously machine monitored and such data is machine compared with operational data required to satisfy a change in production rate determined by machine comparison of the actual production rate and a continuously machine-determined desired production rate. The operational data of the process are machine adjusted to the desired production rate.

It is preferred also to continuously machine compare the machine calculated efficiency with machine monitored flow rates of reactants to the reaction medium and to machine indicate any modification required in at least one efficiency-modifying parameter of the process in response to a decrease in efficiency. When the reduction of chlorate ions with chloride ions is effected at the boiling point of the reaction medium under a subatmospheric pressure and is effected in the presence of at least one chlorine dioxide-producing efficiency-improving catalyst, such as, silver ions, a major efficiency-modifying parameter usually is the quantity of catalyst added to the reaction medium.

In another preferred embodiment, the theoretical reaction medium ionic concentrations are machine determined, the values are machine compared with actual reaction medium ionic concentrations, which may be machine determined or manually determined, and the operational data of the process are machine adjusted to satisfy any machine determined difference.

The process of the invention also includes a shut-down procedure which is machine activated in response to machine detected unacceptable values of at least one operating parameter of the process.

Provision may be made for manually inputting a required chlorine dioxide production rate and machine adjusting the operational data of the process to the production rate required by the manual input irrespective of the machine comparison of actual production rate and machine-determined production rate.

The present invention also includes automatic apparatus for the control of chlorine dioxide production. The apparatus includes a central processing unit comprising a plurality of integrated circuits which are programmed to process a plurality of inputs to provide a plurality of outputs. The central processing unit receives for processing therein a plurality of individual analog inputs corresponding to determined parameters of the process from an analog plant input unit, a plurality of digital inputs corresponding to other determined parameters of the process received from a digital plant input unit and manually-actuated inputs received from an operator input terminal. The central processing unit generates analog output signals to a set point control module having a plurality of set-point controllers for controlling variable position flow valves at settings required by the analog or manual inputs, digital output signals to a digital output unit for control of on-off devices for shutdown or start up of the process in response to the digital signals, and data output signals to recording means.

The machine-controlled process of the invention, and the apparatus of the invention therefor, enables the chlorine dioxide production efficiency and production rate and the chlorine dioxide solution inventory to be closely controlled and maintained at optimum desired levels. By effecting such close control, uneven plant operation is minimized and optimum chemical usage is achieved. A more consistent chlorine dioxide concentration in the solution thereof at desired volume levels is achieved and better control of bleach plant operations with consequently improved pulp quality and economic bleach solution usage is possible.

GENERAL DESCRIPTION OF INVENTION

While the invention has particular applicability to the process of U.S. Pat. No. 3,864,456, and will be described below with reference thereto, the invention is applicable to any chlorine dioxide generating process wherein chlorate is reduced with added chloride ion as the sole reducing agent. Further, while the invention has particular applicability to the control of chlorine-dioxide-producing processes in which a gaseous mixture of chlorine dioxide, chlorine and evaporated water vapor is formed and the generator is maintained under a subatmospheric pressure, the invention may be used with processes which utilize atmospheric pressure and added diluent gas.

One particular chlorine dioxide-producing process to which the present invention may be applied is that described in U.S. Pat. Nos. 3,929,974 and 4,075,308, assigned to the assignee of this application, wherein hydrogen chloride provides both the chloride ion reducing agent for the sodium chlorate and the acidity. In the latter process, operated at the boiling point of the reaction medium under a subatmospheric pressure, the by-product precipitated in the reaction vessel is sodium chloride. The acidity, expressed as actual hydrogen ion concentration, in this process is about 0.05 to about 0.3 normal.

DESCRIPTION OF PREFERRED EMBODIMENT

Figure 1:
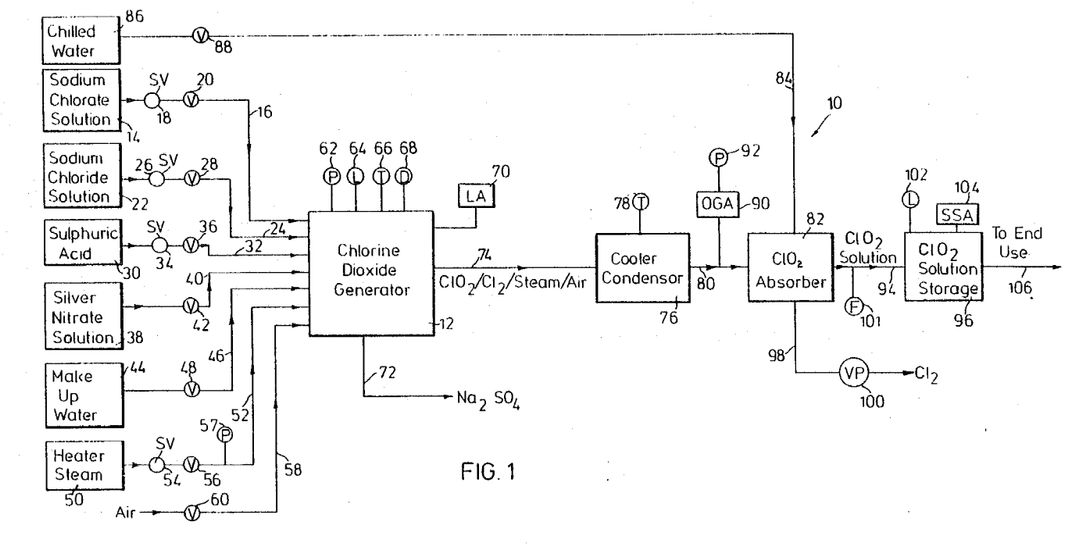
FIG. 1 is a schematic flow sheet of a chlorine dioxide-generating plant in accordance with a preferred embodiment of the invention.

Referring to the drawings, FIG. 1 illustrates a chlorine dioxide generating plant 10 comprising a chlorine dioxide generator 12. In the chlorine dioxide generator, chlorine dioxide and chlorine are formed in a continuous process by reduction of sodium chlorate with sodium chloride in an aqueous acid reaction medium containing sulphuric acid and silver ions or other convenient efficiency-modifying catalyst. The reaction medium is maintained at its boiling point under a subatmospheric pressure, so that the chlorine dioxide and chlorine are diluted with steam. Neutral anhydrous sodium sulphate precipitates from the reaction medium.

A source of sodium chlorate solution 14 for the generator 12 is connected thereto by line 16 through an on-off solenoid valve 18 and a variable setting flow control valve 20. The flow control valve 20 and the other variable position flow control valves mentioned below are of the type which include sensors outputting a signal corresponding to the valve setting. Similarly, a source of sodium chloride solution 22 is connected to the generator 12 by line 24 through an on-off solenoid valve 26 and a variable setting flow control valve 28, and a source of sulphuric acid 30 is connected to the generator 12 by line 32 through an on-off solenoid valve 34 and a variable setting flow control valve 36.

A source 38 of silver nitrate solution, or solution of other chlorine dioxide production efficiency-enhancing catalyst, is connected to the generator 12 by line 40 through a variable setting flow control valve 42 or other convenient flow metering device. A source of make-up water 44 is provided as make-up for filter washing etc. and is schematically shown connected to the generator 12 by line 46 through a variable setting flow control valve 48.

Heater steam from a suitable source 50 is connected to generator medium heating coils in the generator 12 by line 52 through an on-off solenoid valve 54 and a variable setting flow control valve 56 for maintaining the reaction medium at the required reaction temperature. A pressure sensor 57 is provided in line 52 to continuously sense the steam pressure therein. An air bleed to the generator 12 is provided by line 58 through a variable setting flow control valve 60.

Sensors are provided associated with the generator 12 to sense parameters thereof, including pressure sensor 62 to sense the vapor phase pressure, liquid level sensor 64 to sense the level of generator liquor, temperature sensor 66 to sense the temperature of the vapor phase and density sensor 68 to sense the density of the generator liquor. A generator liquor analyzer 70 also is associated with the generator 12 for automatic analysis of the contents of the generator liquor. Manual generator liquor analysis may be effected in place of machine analysis, if desired.

The neutral anhydrous sodium sulphate precipitated from the reaction medium is removed from the generator 12 by line 72 while the product gas stream of chlorine dioxide, chlorine and steam passes by line 74 from the generator 12 to a cooler-condensor 76 wherein the gas stream is cooled and the bulk of the steam condensed. A temperature sensor 78 is associated with the cooler-condensor 76 to sense the temperature of the cooled gas streams.

The cooled gas stream is passed by line 80 to a chlorine dioxide absorption tower 82 wherein the gas stream is contacted with chilled water (usually at about 5° to 10° C.) fed by line 84 thereto from a suitable source 86 through a variable setting flow control valve 88.

An off-gas analyzer 90 is provided to sample the gas stream passing in line 80 to machine determine the relative concentrations of chlorine dioxide and chlorine and the efficiency of chlorine dioxide production. The analysis and manner of determination of efficiency are fully discussed in our copending U.S. patent application Ser. No. 075,098 filed concurrently herewith and assigned to the assignee of this application. The disclosure of the latter application is incorporated herein by reference. The analyzer disclosed in the latter application is pneumatically-operated and a pressure sensor 92 is provided to sense the pneumatic pressure.

Any other convenient type of off-gas analyzer may be used, operated in any convenient manner, such as, electrically or electronically.

The chlorine dioxide solution, which also contains some dissolved chlorine, passes from the absorber 82 by line 94 to a solution storage tank 96 while the remaining chlorine and air are discharged from the absorber 82 by line 98 through vacuum pump 100. The flow rate of chlorine dioxide solution in line 94 is detected by flow rate detector 101. The vacuum pump 100 subjects the vapor phase of the generator 12 to vacuum and a subatmospheric pressure is provided therein as a result of the air bleed by line 58.

The chlorine dioxide storage tank 96 is provided with a liquid level sensor 102 to machine determine the level of chlorine dioxide solution therein, so as to provide a measure of the production rate desired to meet product demand. A solution strength analyzer 104 is provided to determine the concentration of chlorine dioxide in the chlorine dioxide solution present in the storage tank 96.

A chlorine dioxide solution outlet pipe 106 conveys the chlorine dioxide solution from the storage tank 96 to the desired end use location, as desired.

The above-described chlorine dioxide-producing plant 10 produces chlorine dioxide following the procedure of U.S. Pat. No. 3,864,456. Where other chlorine dioxide-producing procedures are used, modifications to certain of the operations may be necessary.

The various sensors and analyzers described above continuously generate signals which are processed in accordance with the procedures described below with respect to the simplified logic flow diagram (FIG. 2) and the hardware diagram (FIG. 3) to provide computer control of the efficiency, production rate and product quality of the chlorine dioxide generating plant 10.

Figure 2:
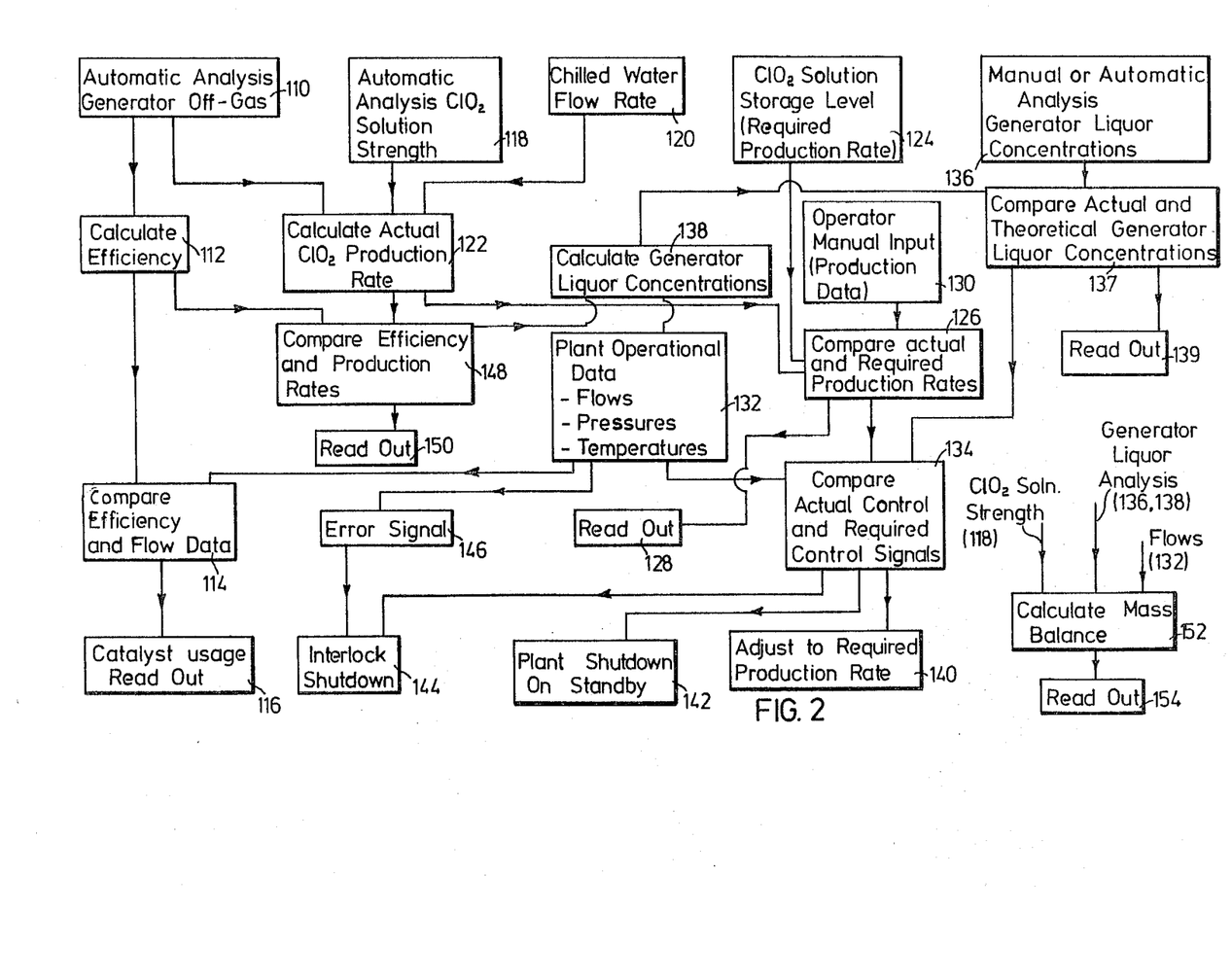
FIG. 2 is a simplified logic diagram illustrating computer control of the chlorine dioxide-generating plant of FIG. 1.

Referring to FIG. 2, generator off-gas is automatically machine analyzed at 110 by off-gas analyzer 90 to determine the concentrations of chlorine dioxide, chlorine and air therein, the efficiency is calculated therefrom at 112, the calculated efficiency is compared at 114 with flow data provided by valves 20, 28, 36, 42 and 48, and the catalyst usage is read out at 116, so that additional catalyst can be added, if required, to restore the efficiency at the desired level.

The calculated efficiency is compared with the flow rate data to ensure that a detected decrease in efficiency is not due to an improper flow rate of one of the reactants. If the detected decrease in efficiency were the result of such an improper flow rate, then the addition of catalyst would have little or no effect. Only if the flow rates are determined to be correct is the catalyst usage read out at 116 to indicate the necessity to compensate for a detected decrease in efficiency by catalyst addition.

The strength of the chlorine dioxide solution which is formed in the chlorine dioxide generating process is analyzed at 118 by solution strength analyzer 104 and the flow rate of chilled water to the chlorine dioxide absorption tower 82, as determined by the flow rate of chlorine dioxide solution in line 94 detected by flow rate detector 101 is measured at 120. These determinations are used to calculate actual production rate at 122.

The concentration of chlorine dioxide, chlorine and air detected in automatic gas analysis at 110 also are used to calculate production rate at 122 by comparison of the ratios of chlorine dioxide to bleed air and chlorine to bleed air. The latter calculation also is used to double check the calculation based on chlorine dioxide solution strength analysis and chilled water flow rate.

The level of chlorine dioxide solution in the chlorine dioxide product solution storage tank 96 is continuously detected at 124 by level sensor 102 to give a measure of the required production rate and also to indicate plant shutdown to a standby basis should the detected inventory exceed a predetermined maximum level. The actual production rate determined at 122 is compared with the required production rate at 126 and a read out of these values is provided at 128. This comparison is effected to determine whether or not adjustment in chlorine dioxide production rate is required.

Provision is made at 130 for manual input to the production rate comparison at 126, so as to permit adjustment of the production rate in accordance with external factors.

Flow rates of reactants and other fluent materials as determined by valves 20, 28, 36, 42 and 48 and plant pressures determined by pressure sensors 57, 62 and 92 and temperatures determined by temperature sensors 66 and 78 are continuously monitored at 132. The flow rate data is used in the flow rate and efficiency comparison at 114 to determine whether or not catalyst flow adjustment is required in response to a decrease in efficiency.

The various plant operational parameters, representing actual plant controls, are compared at 134 with the controls required to achieve the required production rate in accordance with an indication of required production rate adjustment by the production rate comparison at 126.

The individual concentrations of species in the generator liquor may vary as a result of variations in concentrations of feeds and in losses of chemicals from the generator, for example, by way of spillage and with solid by-product. Any such variations result in either too high or too low concentrations of species in the liquor, so that a precise overall material balance cannot be determined directly. A comparison of theoretical or expected generator liquor concentration and actual liquor concentration therefore is required.

The actual concentrations of ionic species in the generator liquor and hence of the reactants may be automatically, semi-automatically or periodically manually analyzed at 136 by generator liquor analyzer 70. The actual liquor analysis is compared at 137 with the theoretical generator liquor concentration calculated at 138 from the plant operational data and the comparison of efficiency and production rate referred to below in order to determine differences.

The presence of differences indicates variations in individual species concentrations arising from one or more of the sources mentioned above. The differences are forwarded to the plant control comparison at 134 and are compensated for by suitable variation of the flow rates by alteration of the settings of one or more of the variable setting valves 20, 28, 36, 42 and 48. When the differences exceed predetermined limits and indicate an undesirable plant operating condition, an alarm read out is provided at 139.

The generator liquor analysis may be omitted, if desired, although it is preferred to include the same, in view of the additional information that is provided.

The comparison of actual control and required control parameters at 134 provides one of three possibilities. The first possibility is the adjustment at 140 of the parameter controls to the required production rate. The second possibility is generated in response to a requirement for plant shutdown to standby at 142 as a result of a maximum inventory of chlorine dioxide solution product.

In the plant standby condition, reactant flows are set to zero by shut-off of the valves 20, 28, 36, 42 and 48 and chilled water flow rate is decreased by suitable variation of the setting of valve 88. The vacuum and reaction temperature are maintained by the vacuum pump 100 and the steam flowing in line 52 respectively to permit immediate resumption of chlorine dioxide production when desired by re-establishment of the reactant flows.

The third possibility is the complete plant interlock shutdown at 144 pursuant to an error signal generation at 146 from the detected plant operational data. An error signal may be generated by undesirably low or high generator temperatures as detected by temperature sensor 66, undesirably high cooler-condenser temperature as detected by temperature sensor 78, undesirably low heating steam pressure as determined by pressure sensor 57 and undesirably low instrument air pressure as detected by pressure sensor 92. Upon plant shutdown, solenoid valves 18, 26, 34 and 54 are closed, other valves set to zero and a purge system (not illustrated) is activated to clear the flow lines of gaseous and liquid materials.

In addition to the above-described utilization of the efficiency calculation at 112 and the production rate calculation at 122, periodic comparison of the efficiency and production rate may be effected at 148 to give a read out at 150, the read out being the production rate expressed as a percentage of efficiency and serving an informational function as to the overall performance of the chlorine dioxide producing plant 10.

The chlorine dioxide solution strength analysis determined at 118, the generator liquor analysis determined at 136 and/or 138 and the flow rate data determined at 132 may be intermittently or continuously processed to calculate an approximate overall mass balance for the chlorine dioxide-producing plant 10 at 152, the calculated mass balance giving a read out at 154.

The various read outs at 128, 150 and 154 may be stored in any convenient manner for continuous, intermittent or alternate display by a visual display device, such as, a cathode ray tube (CRT) display unit and/or for continuous, intermittent or alternate print-out by any convenient printing device.

Figure 3:
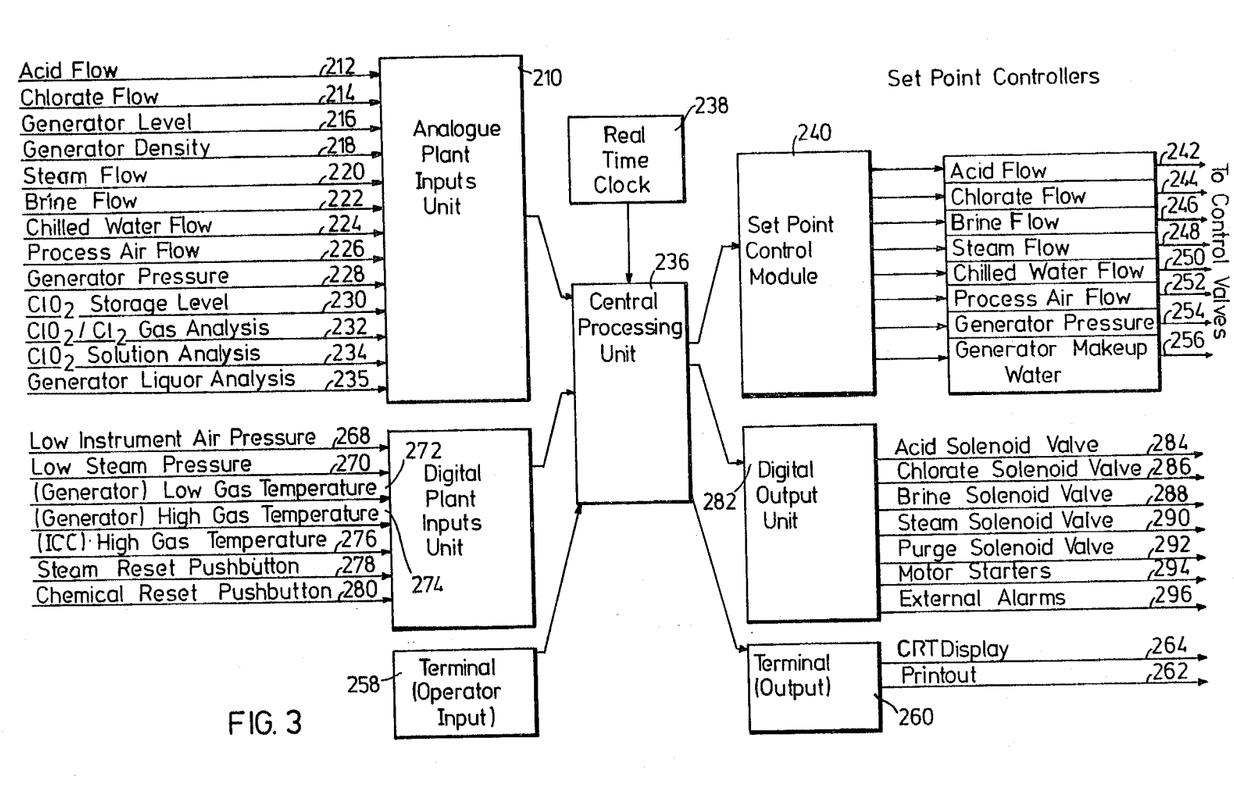
FIG. 3 is a schematic flow diagram of the control system used in the computer operations of FIG. 2.

FIG. 3 illustrates the hardware required to effect the operations set forth in FIG. 2. A plurality of analog plant inputs is received by an analog plant inputs unit 210. These inputs respectively are acid flow as detected by valve 36 in line 212, sodium chlorate solution flow as detected by valve 20 in line 214, generator liquid level as detected by level sensor 64 in line 216, generator liquor density as detected by density sensor 68 in line 218, heater steam flow as detected by valve 56 in line 220, sodium chloride solution flow as detected by valve 28 in line 222, chlorine dioxide absorber water flow as detected by flow rate detector 101 in line 224, process air flow as detected by valve 60 in line 226, generator pressure as detected by pressure sensor 62 in line 228, chlorine dioxide solution storage tank level as detected by level sensor 102 in line 230, off-gas stream gas analysis as determined by gas analyzer 90 in line 232, chlorine dioxide solution strength as determined by solution strength analyzer 104 in line 234 and generator liquor analysis as determined by liquor analyzer 70 in line 235.

These analog inputs are forwarded to a central processing unit 236 controlled by a real time clock 238. The central processing unit 236 consists of a plurality of integrated circuits which are program-controlled to effect the calculations described with respect to FIG. 2. The analog inputs are processed in the central processing unit 236 to provide signals to a set point control module 240 which produces individual controls of the various flow valve settings, so that the desired production efficiency, production rate and solution concentration are attained, or the plant is shut down to a standby condition in response to a high storage level signal as detected by level sensor 102 in line 230.

The individual output signals of the set point control module 240 for control of the valve settings are acid flow in line 242 to valve 36, sodium chlorate solution flow in line 244 to valve 20, sodium chloride solution flow in line 246 to valve 28, heater steam flow in line 248 to valve 56, chlorine dioxide absorber water flow in line 250 to valve 88, process air flow in line 252 to valve 60, generator pressure in line 254 to vacuum pump 100, and generator make-up water flow in line 256 to valve 48.

An input terminal 258 is provided to permit operator input of process requirements and manual analysis to the central processing unit 236 to override and/or supplement the analog signals and/or to modify the program controlling the central processing unit 236. An output terminal 260 is provided to produce a printout in line 262 and a visual display, such as, a CRT display, in line 264, so that visual and printed records of current and past performance are maintained.

A digital plant inputs unit 266 is provided to receive digital signals corresponding to undesirable conditions of operation of the chlorine dioxide process which require complete interlock shutdown and to reset requirements. The digital signals corresponding to shutdown requirements are low instrument air pressure as detected by pressure sensor 92 in line 268, low steam pressure as detected by pressure sensor 57 in line 270, low generator gas temperature as detected by temperature sensor 66 in line 272, high generator gas temperature as detected by temperature sensor 66 in line 274 and high gas temperature as detected by temperature sensor 78 in the cooler-condensor 76 in line 276. Reset signals are generated by pushbutton resets of steam flow in line 278 and chemical feed in line 280.

The digital signals are fed to the central processing unit 236 and are processed therein to provide signals to a digital output unit 282 which produces a plurality of individual digital output signals. The individual digital outputs are on-off signals to the acid flow solenoid valve 34 in line 284, the sodium chlorate solution flow solenoid valve 18 in line 286, the sodium chloride solution flow solenoid valve 26 in line 288, the steam flow solenoid valve 54 in line 290, a purge media flow solenoid valve in line 292, motors in line 294 and external alarms in line 296.

By closely controlling the efficiency of chlorine dioxide production and the rate of production in response both to solution concentration and product demand in the above-described manner, uneven plant operation is minimized and optimum chemical usage is achieved. Since a chlorine dioxide solution of consistent concentration is provided, better control of bleach plant operations is possible with improved pulp quality and economic bleach solution usage.

Manpower requirements of plant operation are considerably decreased since only occasional chemical analysis and visual checks of the read outs are required.

In summary of this disclosure, the present invention is directed to improvements in chlorine dioxide production processes by continuous monitoring of parameters of the system and making adjustments accordingly. Modifications are possible within the scope of the invention.

What we claim is:

1. In a process for the continuous production of an aqueous solution of chlorine dioxide by continuously reducing chlorate ions with chloride ions in the substantial absence of any reducing agent for chlorine and in an acid aqueous reaction medium to form a product gas stream containing chlorine dioxide and chlorine and continuously dissolving chlorine dioxide fom said product gas stream in water, the improvement which comprises machine controlling said process by the operations of:

(a) continuously machine analyzing the product gas stream to determine the concentrations of chlorine dioxide and chlorine therein and machine computing the efficiency of conversion of chlorate ions to chlorine dioxide from said machine analysis;

(b) continuously machine analyzing said aqeous solution of chlorine dioxide to determine the concentration of chlorine dioxide therein, continuously machine monitoring the water flow rate to said dissolving step, and machine computing the rate of production of chlorine dioxide and chlorine from said concentration determination and water flow rate;

(c) continuously machine monitoring the operational data of the process, machine comparing said data with the operational data required to satisfy a change in production rate determined by machine comparison of the actual production rate and a continuously machine-determined desired production rate, and machine adjusting the operational data of the process to the required production rate.

2. The process of claim 1, including continuously machine comparing the machine computed efficiency with machine monitored flow rates of reactants to the reaction medium and machine indicating any modification required in at least one machine-modifying parameter of the process in response to a decrease in efficiency.

3. The process of claim 2, wherein the reduction of chlorate ions with chloride ions is effected at the boiling point of the reaction medium under a subatmospheric pressure and is effected in the presence of at least one chlorine dioxide-producing efficiency-improving catalyst, and adding said catalyst to the reaction medium in response to the machine-indicated modification requirement.

4. The process of claim 1 including machine determining the theoretical reaction medium ionic concentrations, machine comparing the latter values with actual reaction medium ionic concentrations, and machine adjusting the operational data of the process to satisfy any determined difference in theoretical and actual ionic concentrations.

5. The process of claim 4 wherein said actual reaction medium ionic concentrations are machine determined.

6. The process of claim 1 including machine determining a requirement for process shutdown in response to detected unacceptable values of at least one operating parameter of the process and machine activating shutdown of the process.

7. The process of claim 1, 2, 3, 4 or 6 including manually inputting a required chloride dioxide production rate and machine adjusting the operational data of the process to the production rate required by the manual input irrespective of the machine comparison of actual production rate and machine-determined production rate.

8. A machine-controlled continuous process for the production of chlorine dioxide, which comprises:

(a) continuously feeding to a reaction zone containing an aqueous reaction medium reactant streams containing sodium chlorate, sodium chloride, sulphuric acid, and chlorine dioxide production efficiency-enhancing catalyst;

(b) continuously flowing steam into heat exchange relationship with said reaction zone to maintain said aqueous reaction medium at its boiling point, (c) continuously subjecting said reaction zone to a vacuum and continuously bleeding air into said reaction zone to provide a subatmospheric pressure therein, (d) continuously removing from said reaction zone a product gas stream consisting of chlorine dioxide, chlorine, steam and air, (e) continuously cooling said gas stream to condense at least a substantial proportion of said steam, (f) continuously contacting the resulting cooled gas stream with a water stream to dissolve the chlorine dioxide content thereof and part of the chlorine content thereof, (g) continuously forwarding the resulting chlorine dioxide solution to a chlorine dioxide solution storage zone, (h) continuously controlling the flow and monitoring the flow rate of said reactant streams, of said water stream and of said air bleed stream, continuously controlling the flow and monitoring the flow rate of heater stream to said heat exchange relationship;

(i) continuously sensing the temperature and pressure of the gaseous phase in said reaction zone, the level and density of said reaction medium in said reaction zone, the temperature of said cooled gas stream, the level of chlorine dioxide solution in said storage zone and the pressure of said heater steam stream, (j) continuously machine analyzing said cooled gas stream to determine the concentrations of chlorine dioxide and chlorine therein and machine computing the efficiency of conversion of chlorate ions to chlorine dioxide from said machine analysis;

(k) continuously machine analyzing said aqueous solution of chlorine dioxide to determine the concentration of chlorine dioxide therein and machine computing the rate of production of chlorine dioxide and chlorine from said concentration determination and said monitored water stream flow rate;

(l) continuously machine comparing the machine computed efficiency with the machine monitored flow rates of said reactant streams to the reaction medium, machine indicating any modifications in catalyst stream flow rate requirement in response to a decrease in efficiency, and varying the catalyst stream flow rate accordingly;

(m) continuously machine determining desired production rate in response to sensed changing levels in said storage zone, continuously machine comparing said desired production rate with said actual production rate, machine determining operational data of process required to effect a change in actual production rate to correspond to said desired production rate, machine comparing said operational data with existing operational data of the process provided by said monitored flow rates and sensed parameters, and machine adjusting said flow rates and parameters to the values required to provide said change in production rate; and (n) machine determining theoretical reaction medium ionic concentrations, machine comparing the latter values with actual reaction medium ionic concentrations, and machine adjusting said flow rates and parameters to the values required to satisfy any determined difference in theoretical and actual ionic concentrations.

9. The process of claim 8 including machine determining said actual reaction medium ionic concentrations.

10. The process of claim 8 including manually inputting a required production rate and machine adjusting said flow rates and parameters as required by the manual input irrespective of the machine comparison of actual production rate and machine-determined required production rate.

11. The process of claim 8, including machine actuating shutdown of the process in response to detected predetermined unacceptable values for at least one of said sensed parameters.

12. A system for the production of chlorine dioxide, which comprises:

a chlorine dioxide generator vessel;

first reactant conduit means connected in fluid flow relationship between a source of sodium chlorate solution and said generator vessel for feeding sodium chlorate solution into said vessel and having first on-off valve means, first adjustable flow position valve means and first flow rate sensing means operably associated with said first conduit means;

second reactant conduit means connected in fluid flow relationship between a source of sodium chloride solution and said generator vessel for feeding sodium chloride solution into said vessel and having second on-off valve means, second adjustable flow position valve means and second flow rate sensing means operably associated with said second conduit means;

third reactant conduit means connected in fluid flow relationship between a source of sulphuric acid and said generator vessel for feeding sulphuric acid to said vessel and having third on-off valve means, third adjustable flow position valve means and third flow rate sensing means operably associated with said third conduit means;

first level sensing means for sensing the level of reaction medium liquor in said generator;

density sensing means for sensing the density of reaction medium liquor in said generator;

heater fluid conduit means connected in fluid flow relationship between a source of steam and said generator vessel for heating reaction medium liquor in said vessel and having fourth on-off valve means, fourth adjustable flow position valve means, fourth flow rate sensing means and first pressure sensing means operably associated with said first heater fluid conduit means;

fourth reactant conduit means connected in fluid flow relationship between a source of efficiency-improving catalyst and said generator vessel for feeding catalyst into said vessel and having fifth adjustable flow position valve means and fifth flow rate sensing means associated with said fourth conduit means;

gaseous product conduit means for conveying a gaseous mixture of chlorine dioxide, chlorine and steam from said generator vessel to cooler-condensor means for cooling said gaseous mixture and condensing a substantial proportion of the steam therein;

gas-liquid contact means communicating with said gaseous product conduit means downstream of said cooler-condensor means;

water conduit means in fluid flow communication with a source of water and said gas-liquid contact means for feeding water thereto to absorb chlorine dioxide from said cooled gas mixture in said gas-liquid contact means, said water conduit means having sixth adjustable flow position valve means;

product solution conduit means connected in fluid flow relationship between a liquid outlet of said gas-liquid contact means and product storage tank means for conveying chlorine dioxide solution to said storage tank means and sixth flow rate sensing means associated with said product conduit means;

second level sensing means for sensing the level of chlorine dioxide solution in said storage tank means;

air flow conduit means connected in fluid flow relationship between a source of air and said generator vessel for bleed of air to said generator vessel and having seventh adjustable position valve means associated with said air flow conduit means;

vacuum inducing means operably connected to a gaseous outlet of said gas-liquid contact means for applying vacuum to said generator vessel and in conjunction with said air bleed to establish a subatmospheric pressure in said vessel, and second pressure sensing means for sensing the absolute pressure in said generator vessel;

first machine analyzer means for analyzing the concentrations of chlorine dioxide, chlorine and air in said gas mixture in said gaseous product conduit means and for generating signals corresponding to the analysis;

second machine analyzer means for analyzing the concentration of chlorine dioxide in said chlorine dioxide solution in said storage tank and for generating a signal corresponding to the analysis;

third machine analyzer means for analyzing the concentrations of reactants in the reaction medium in said generator vessel and for generating signals corresponding to the analysis;

first gas temperature sensing means for sensing the temperature of the gaseous phase in said generator vessel;

second gas temperature sensing means for sensing the temperature of the gaseous phase in said cooler-condensor;

integrated circuit means programmed to continuously receive analog signals from said first, second, third, fourth, fifth and sixth slow rate sensing means, said first and second level sensing means, said density sensing means, said second pressure sensing means, and said first, second and third analyzer means and to intermittently receive digital signals from said first pressure sensing means, said first and second temperature sensing means and said second level sensig means;

said integrated circuit means further being programmed to process said analog signals to compute the efficiency of chlorine dioxide production from said reaction medium and to generate first set point control signal output in response to variations in efficiency from desired level, to compute the production rate of chlorine dioxide from said reaction medium, to generate second set-point control signal output in response to variations in production rate from desired levels and to generate third set-point control signal output in response to standby shutdown requirements corresponding to maximum permitted level in said product storage tank;

said set-point control signals determining the position of each of said first to seventh adjustable flow position valve means in response to the computed efficiency and production rate and to standby shutdown requirements;

said integrated circuit means further being programmed to process any one of said digital signals to generate first digital signal output signal to inactivate said first to fourth on-off valve means and to set said first to seventh variable position valves to a zero setting.

13. The system of claim 12 including manual input means for introducing to said integrated circuit means an analog signal corresponding to a desired production rate and wherein said integrated circuit means is programmed to process said latter analog signal to generate third set point control signal output in response to said desired production rate irrespective of said computed production rate.

14. The system of claim 12 or 13 wherein said integrated circuit means is programmed to generate recorder output signals and including recording means for recording said latter output signals.

* * * * *